United States Patent [19]

Bare et al.

[11] 4,290,138

[45] Sep. 15, 1981

[54] WIRE FIRE MAPPING FOR PRINTERS

[75] Inventors: Gary T. Bare; Lee T. Zimmerman, both of Boca Raton, Fla.

[73] Assignee: International Business Machines Corporation, Armonk, N.Y.

[21] Appl. No.: 86,383

[22] Filed: Oct. 19, 1979

[51] Int. Cl.³ ............................................. G06F 11/32
[52] U.S. Cl. ........................................ 371/29; 371/20
[58] Field of Search .................... 371/20, 25, 27, 29, 371/67; 101/93.05, 93.15, DIG. 15

[56] References Cited

U.S. PATENT DOCUMENTS

| | | | |
|---|---|---|---|
| 3,066,601 | 12/1962 | Eden | 371/67 X |
| 3,560,926 | 2/1971 | Mrkvicka | 371/67 |
| 4,027,764 | 6/1977 | Kashio | 371/67 X |
| 4,034,194 | 7/1977 | Thomas et al. | 371/20 X |
| 4,158,432 | 6/1979 | Van Bavel | 371/20 |

OTHER PUBLICATIONS

J. E. Lisinski, "Front and Rear Wire Matrix Line Printer", *IBM Technical Disclosure Bulletin*, vol. 21, No. 5, 10-1978, p. 1772.

F. W. Schaaf, "Serial Printer Error Correction", *IMB Technical Disclosure Bulletin*, vol. 4, No. 11, 4-1962, pp. 14-15.

*Primary Examiner*—Jerry Smith
*Attorney, Agent, or Firm*—D. Kendall Cooper

[57] ABSTRACT

A diagnostic routine is provided for a printer or printer subsystem having a plurality of print wires and print heads arranged in a nonconventional wire image pattern, the diagnostic routine providing a printout of wire firing and misfiring to quickly and accurately indicate the condition of the wires, wire actuators, and other components.

3 Claims 15 Drawing Figures

WIRE FIRE MAPPING FOR PRINTERS

BACKGROUND OF THE INVENTION

This invention relates to diagnostic testing and more particularly testing of this nature having utility in connection with printer subsystems and the like.

A variety of diagnostic tests have been proposed heretofore especially involving computer diagnostics and printer diagnostics. Diagnostic tests have ordinarily not enabled the display of the firing and/or misfiring of print wires in a wire matrix printer. This is especially true for wire matrix printers that use nonconventional print wire arrangements.

SUMMARY OF THE INVENTION

In accordance with the present invention, diagnostic routines are provided in a wire matrix printer subsystem for displaying the actual firing and misfiring conditions of a plurality of print wires, the print wires being arranged in accordance with a nonconventional print wire arrangement. Thus, in the present printer subsystem, there are a plurality of print heads, such as eight in number, each print head comprising a plurality of print wires, such as eight in number, for a total of sixty-four print wires. The print wires in the individual print heads are arranged in accordance with a a slanted serrated pattern to allow more efficient mounting of the print wire actuators and easier servicing. The diagnostic routines described herein offer considerable advantage in servicing a printer subsystem of this nature since when the printer is placed in "wire fire mapping" test diagnostic procedure, the printer will print out an actual mapping that indicates quickly and directly to the field engineer or user the firing and misfiring states of all of the print wires.

CROSS-REFERENCE TO RELATED PATENT APPLICATIONS

The present patent application is one of a group of copending patent applications which concern the same overall printer subsystem configuration but which individually claim different inventive concepts embodied in such overall printer subsystem configuration. These related patent applications were filed on the same date, namely, Oct. 19, 1979, are specifically incorporated by reference herein and are more particularly described as follows:

(1) Application Ser. No. 086,484 entitled "Printer Subsystem with Microprocessor Control", the inventors being Messrs. William W. Boynton, et al;

(2) Application Ser. No. 086,384 entitled "Font Selection and Compression for Printer Subsystem", the inventor being Mr. Lee T. Zimmerman;

(3) Application Ser. No. 086,492 entitled "Print Head Image Generator for Printer Subsystem", the inventors being Messrs. Abelardo D. Blanco et al; and (4) Application Ser. No. 086,483 entitled "Print Wire Actuator Block Assembly for Printers", the inventor being Mr. Albert W. Oaten.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host to print on the forms and in turn provides status signals to the host during operations.

The printer itself is an output line printer designed to satisfy a variety of printing requirements in data processing, data collection, data entry, and communications systems. It can be used as a system printer or a remote work station printer.

The following printer highlights are of interest:

Print density of 10 to 15 characters per inch (25.4 mm) selectable by the operator or by the using system program;

Condensed print mode, 15 characters per inch (25.4 mm), saves paper costs and makes report handling, mailing, reproduction, and storage easier;

Line spacing of 6 or 8 lines per inch (25.4 mm) selectable by the operator or any other line density by the using system program;

Incremental and reverse forms movement selectable by the using system program;

Sixteen self-contained character sets selectable by the using system program with a base language selected by hardware jumpers;

Special graphics ability (special characters, graphs, plotting, etc.) selectable by the using system program;

Matrix printing technology;

Built-in diagnostics for problem determination by the operator;

Microprocessor control unit;

Maximum print line width—330.2 mm (13.2 in);

Maximum print positions for 10 characters per inch (25.4 mm)—132;

Maximum print positions for 15 characters per inch (25.4 mm)—198;

Adjustable forms width—76.2 to 450 mm (3.0 to 17.7 in);

Maximum forms length—76.2 to 317.5 mm (3.0 to 12.5 in).

Figures 1, 2:
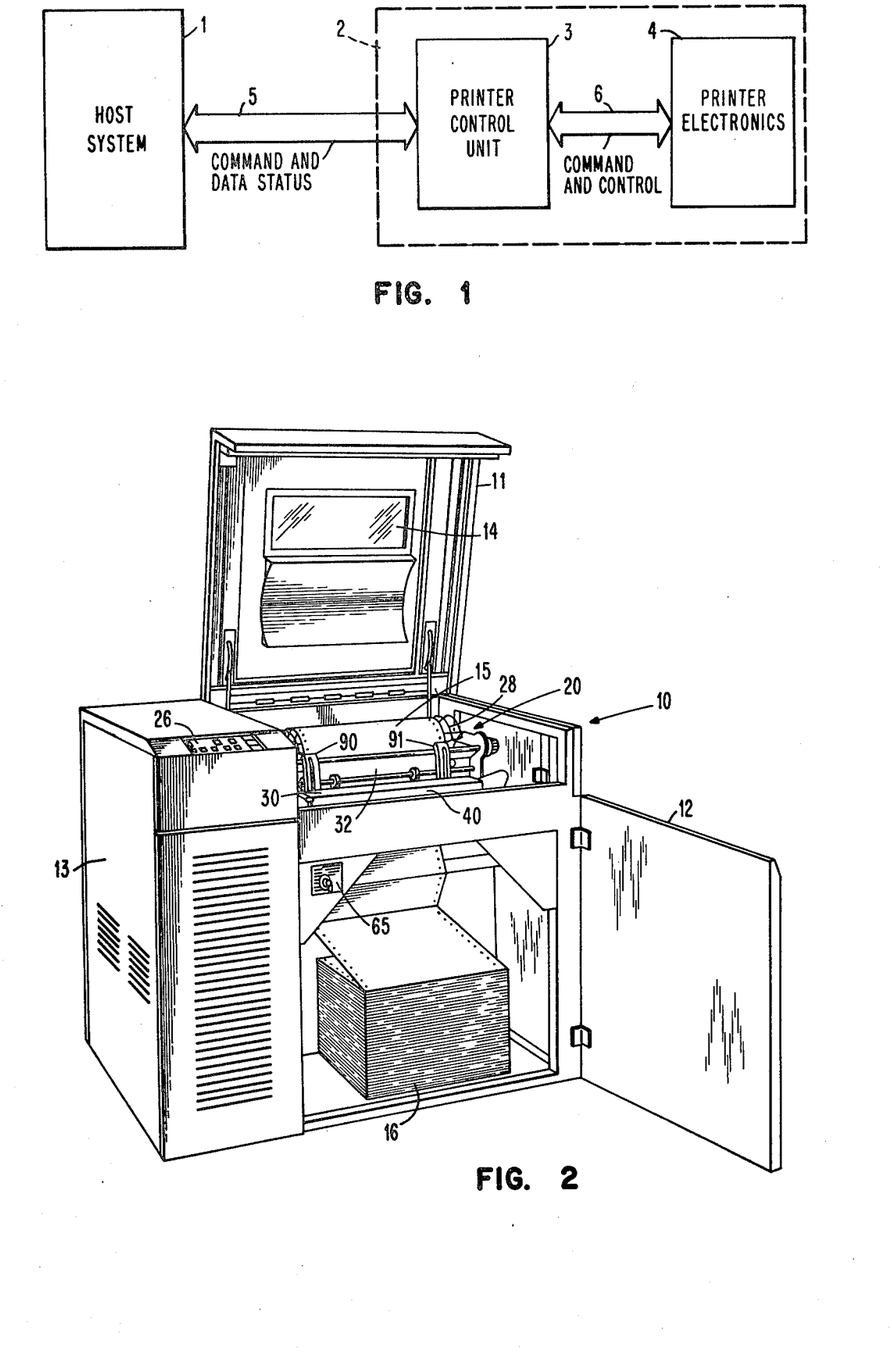
FIG. 1 is a simplified system diagram for the printer subsystem.
FIG. 2 illustrates the printer console and a number of printer components as well as forms feeding.

FIG. 1 illustrates a representative system configuration incuding a host system 1 and the printer subsystem 2 which includes a printer control unit 3 and printer electronics 4. Command and data signals are provided by the host system by way of interface 5 and command and control signals are provided from printer control unit 3 to the printer electronics 4 by way of bus 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier, the operator panel, and the printer sensors.

The elements of the system, such as the printer control unit and printer electronics, incorporate one or more microprocessors or microcomputers to analyze commands and data and to control operations.

Figure 3:
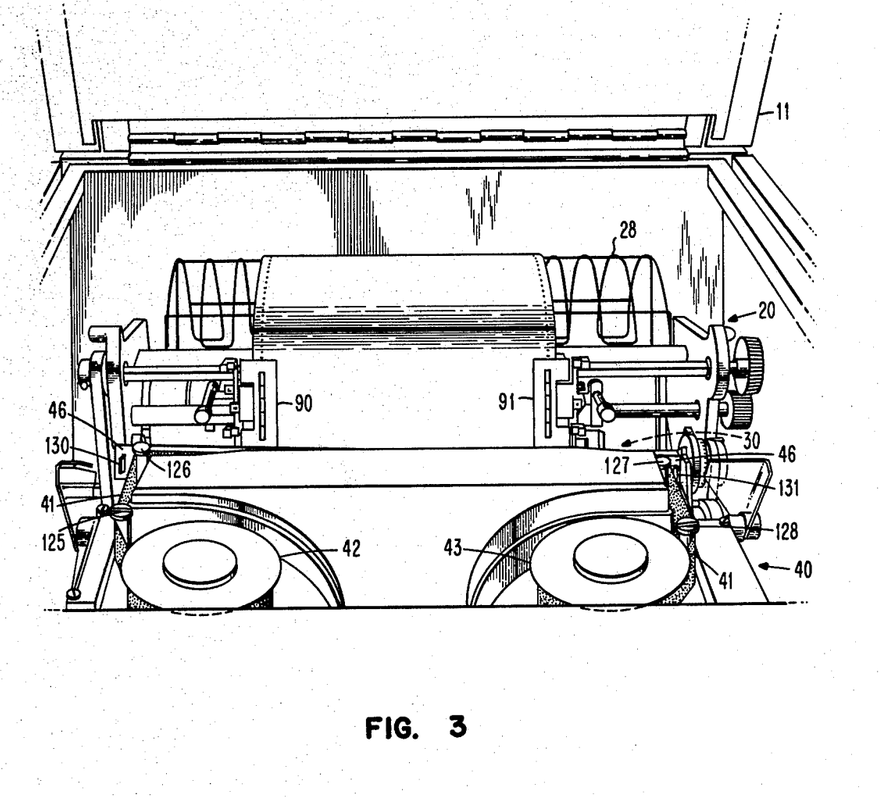
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover is closed. The forms 15 are provided from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms after printing to a takeup stack, not shown but positioned below the printing mechanism and to the rear of the printer console. The printer incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

Figure 8A:
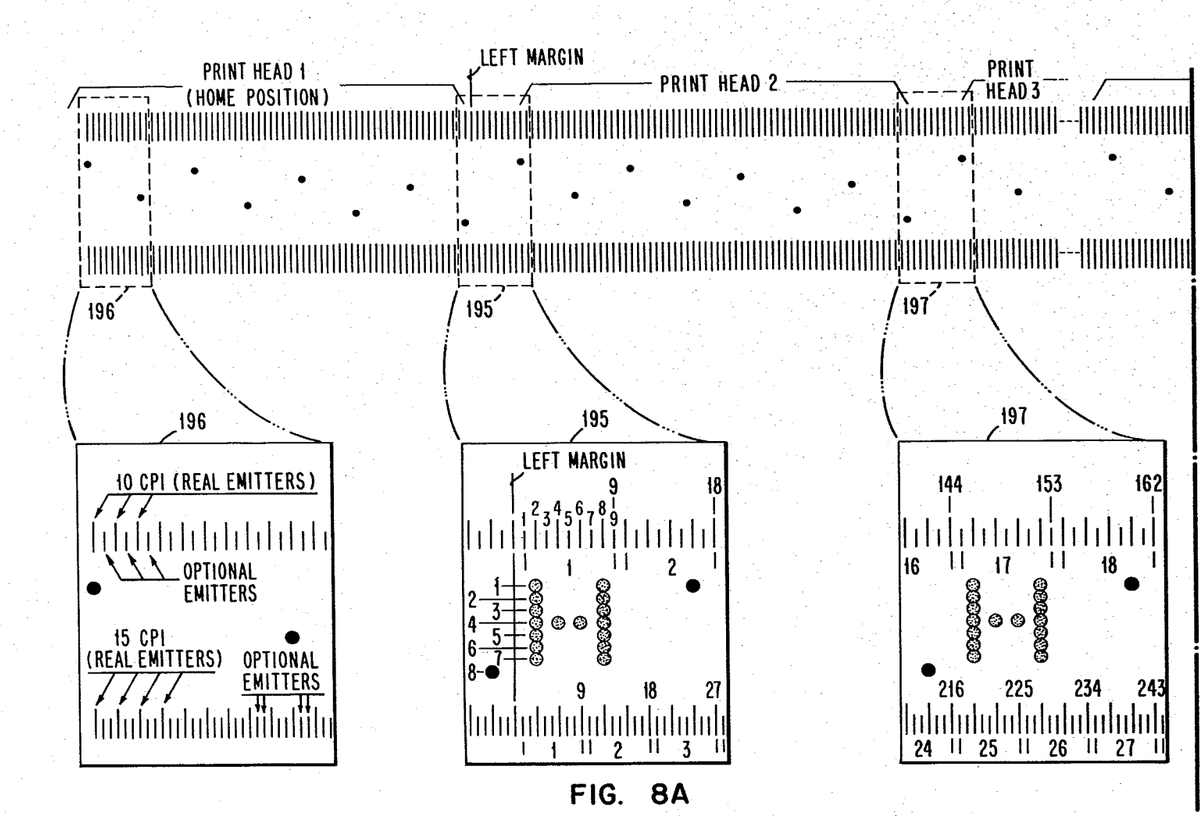
FIGS. 8A and 8B, when arranged as shown in FIG. 9, show in greater detail the relationship of the print wires to character locations on the forms to be printed.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize hold ink smudging on forms 15. Ribbon service life is typically 60 million characters. Two motors shown more clearly in FIG. 8 drive ribbon 41 back and forth between spools 42 and 43. The printer control unit detects ribbon jams and end of ribbon (EOR) conditions. A ribbon jam turns on an error indicator and stops printing. An EOR condition reverses the ribbon drive direction.

The printer includes an operator panel 26 (shown in greater detail in FIG. 4) that consists of several operator control keys (pushbuttons 51-55 and 60), two indicator lights 56, 57, a power on/off switch 58, and an operator panel display 59. By using various combinations of the keys in conjunction with the shift key 55 the operation can: start or stop printing and view the last line printed, set print density, position the forms up or down one page or one line at a time, move the forms incrementally up or down for fine adjustment, and start or stop the diagnostic tests when selected by a mode switch, to be described.

Figure 4:
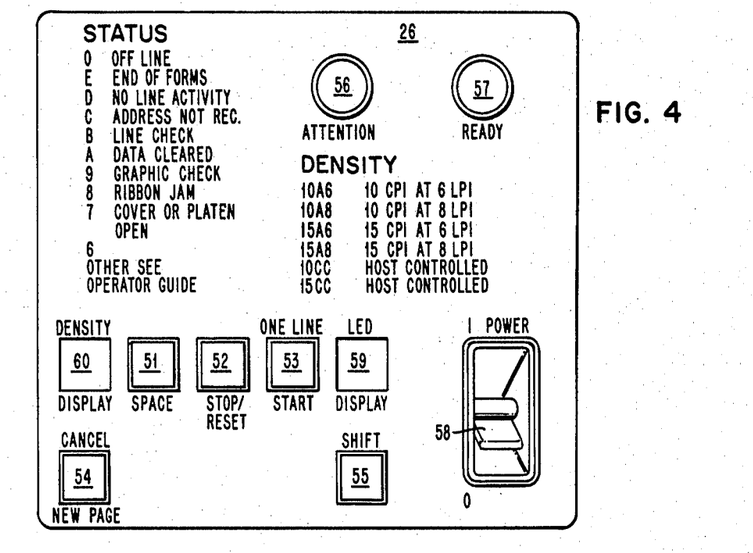
FIG. 4 illustrates an operator panel useful with the printer of FIGS. 1 and 2.

The indicator lights and display on the operator panel notify the operator that: the printer is ready to print data from the using system (57), the printer requires attention (56), the current print density setting (59), errors, if any, have been detected, and the results of the diagnostic tests (59).

Figure 5:
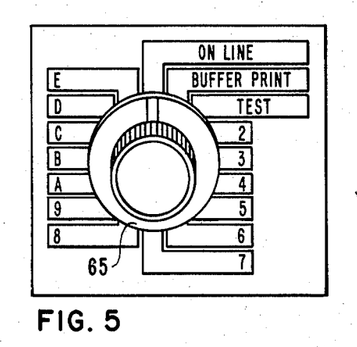
FIG. 5 shows a mode switch for control of on-line, off-line conditions.

A 16-position mode switch 64 is located behind the front door 12 and is shown in greater detail in FIG. 5. The on-line positions permit printing to be controlled by the using system. All other positions are off-line and do not allow printing to be initiated from the using system.

The first three switch positions are used by the operator to select these modes:

On-line.

The normal operating position. With the switch in this position, the printer accepts commands from the using system. The operator panel display 59 indicates any detected error conditions.

Buffer Print.

An additional on-line position which prints the EBCDIC value (hexadecimal codes) sent from the host and the associated character images. No control characters are interpreted. This feature allows the user to view the data stream sent to the printer.

Test.

For off-line checkout and problem determination. In test mode, when Start key 53 is pressed, the attention indicator (56) stays on and the Ready indicator (57) is turned on until the diagnostic tests that are stored in the printer control unit are finished or the Stop key is pressed. If an error is detected, the printer stops and displays an error code in the operator panel display 59.

The remaining thirteen (13) positions of the mode switch designated "2-9" and "A-E" are used by service personnel to select a variety of diagnostic tests to aid in off-line problem determination and confirmation of service requirements.

Mode Switch Positions

Following is a listing of mode switch positions and their functions. The Wire Fire Print Test is initiated from two positions. Mode 1 ("Test") initiates printing of ripple, wire fire, and plot tests and Mode 3 initiates printing of the wire fire test only.

| Position | Hex Designation | Function |
| --- | --- | --- |
| ONLIN | X'F' | On-Line Run |
| EBCPT | X'0' | EBCDIC Print |
| MODE1 | X'1' | Test: Ripple-Wire Fire-Plot |
| MODE2 | X'6' | Ripple Print |
| MODE3 | X'5' | Wire Fire Print Test |

| Position | Hex Designation | Function |
| --- | --- | --- |
| MODE4 | X'7' | Plot Test |
| MODE5 | X'9' | Test Op Panel Test |
| MODE6 | X'3' | Head Speed Test |
| MODE7 | X'4' | Forms Speed Test |
| MODE8 | X'A' | A Symmetry Test |
| MODE9 | X'B' | B Symmetry Test |
| MODEA | X'C' | Quadrature Test |
| MODEB | X'2' | Loop Diagnostic Test |
| MODEC | X'8' | Ribbon Test |
| MODED | X'D' | Mode Switch Position - Free (Temp PT) |
| MODEE | X'E' | Error Word Display - Print |

Figure 6:
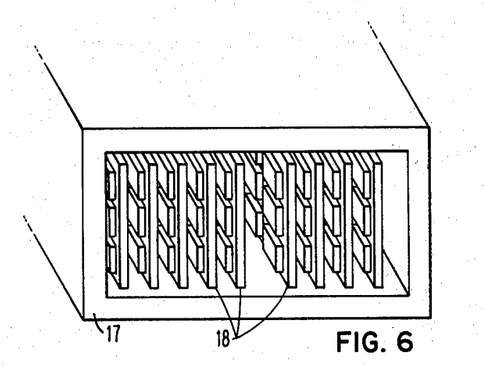
FIG. 6 shows a gate assembly with printed circuit cards.

FIG. 6 illustrates a gate assembly 17 located behind side cover 13, FIG. 2, the gate assembly including modular printed circuit cards such as cards 8 that contain much of the circuit elements for printer control unit 3 and printer electronics 4, FIG. 1.

Figure 7:
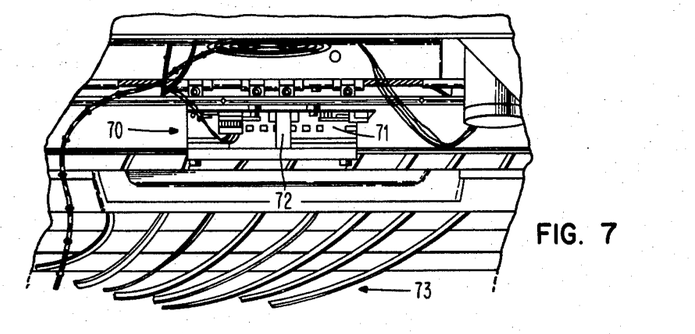
FIG. 7 is a frontal view of the printer console of FIG. 2 with the cover open showing a print emitter.

FIG. 7 is a frontal view of a print emitter assembly 70 that includes an emitter glass 71 and an optical sensor assembly 72. Glass 71 is vertically positioned with respect to sensor assembly 72 and is mechanically attached to print mechanism 30 so that as the print heads, print actuators, and print wires move back and forth left to right and conversely as viewed in FIG. 7, glass 71 also moves in the same manner with respect to sensor assembly 72 to indicate horizontal position of the print wires. Cabling 73 supplies signals to the print wire actuators.

Figure 8B:
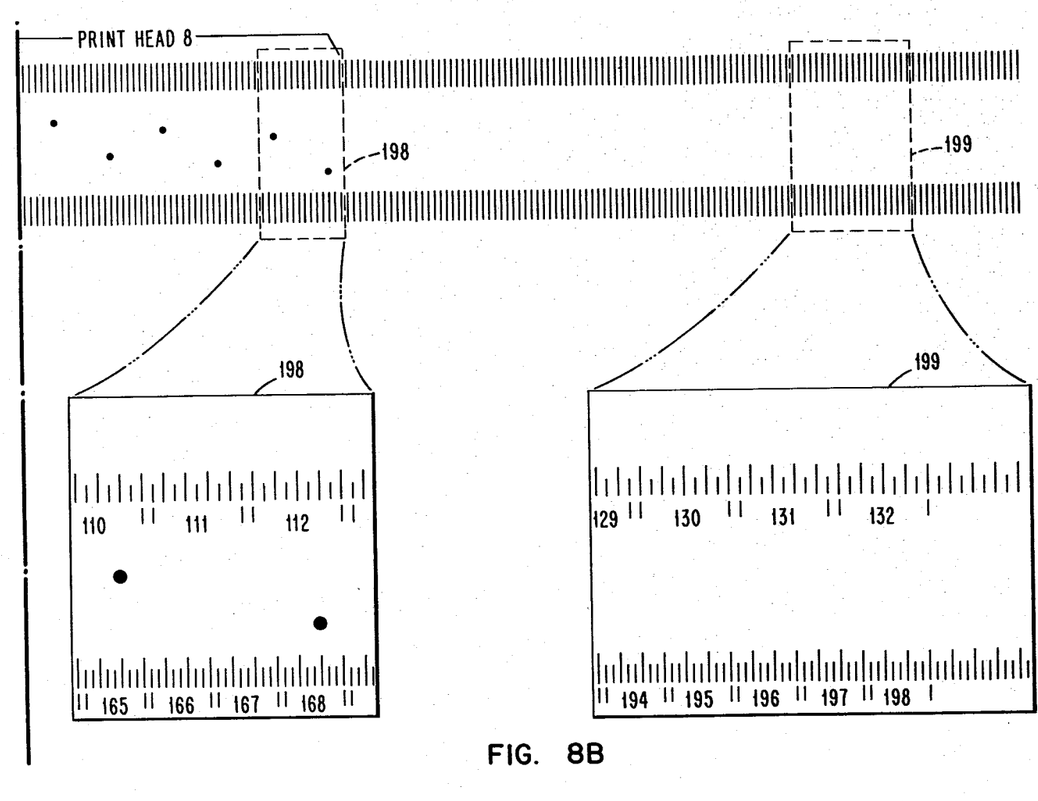
Figure 9:
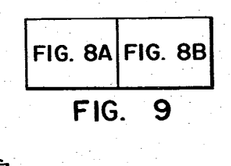

FIGS. 8A and 8B, when arranged as shown in FIG. 9, comprise a diagram showing the physical relationship of the print heads when in the home position relative to character locations on a form to be printed. In addition, the emitter relationships are shown.

In FIG. 8A, print head 1, comprising eight print wires, is normally to the left of the nominal left margin when in home position. Print head 2 lies to the right of the left margin when the print assembly is in home position and the other print heads up to eight, as an example, are physically located at successively further positions to the right in relation to the form. The print wires are arranged in a sloped serrated pattern and are displaced two character positions apart horizontally and one dot location apart vertically. In order to print the character "H" as shown in inset 195, it is necessary that all of the print wires in print head 1 sweep past the "H" character location to effect printing of the individual dots. As each wire passes by and reaches the appropriate position for printing of its assigned dot locations in a vertical direction, it is fired. Thus, formation of characters takes place in a flowing or undulating fashion insofar as the printing of the dots is concerned. That is, an entire vertical column of dots as in the left-hand portion of the character "H" is not formed all at once but is formed in succession as the eight wires in print head 1 sweep past that column. This is true of the printing of all other character columns, as well. As a result of this, each print head is required to pass at least far enough so that all of the wires in that print head will be able to print both the first vertical column of dots in the first character required as well as the last column of dots in the last character to be printed in the group of character locations assigned to that print head.

Accordingly, print head 1, during printing movement of carrier 31, prints all of the characters that normally would appear underneath print head 2 when the print heads are in their home position. The printing of dots associated with print head 2 takes place under the home position for print head 3 and so on.

Inset 196 illustrates the relationship of real and optional emitters, sometimes referred to as "false" emitters, for both ten characters per inch (10 CPI) and fifteen characters per inch (15 CPI). During the printing of characters at ten characters per inch, real emitters are found as indicated. These are physical real emitters derived from the emitter glass 71 as the print assembly sweeps from left to right or right to left during printing. The same real emitters are used for printing at fifteen characters per inch. However, when printing is at ten characters per inch, one additional (optional) emitter is necessary between each successive pair of real emitters to form the individual characters while, if characters are printed at fifteen characters per inch, two additional (optional) emitters are required between each successive pair of real emitters to handle the printing of dots for those characters.

Inset 197, FIG. 8A, illustrates the character locations associated with the rightmost print wire of print head 2 and the leftmost print wire of print head 3. Print heads 4-7 are not shown since the relations essentially repeat those shown with respect to print heads 1-3. The rightmost wires of print head 8 are shown in Inset 198, FIG. 8B. In addition, Inset 199 shows that for ten characters per inch, 132 characters can be accommodated in a full print line while for fifteen characters per inch, 198 characters are accommodated.

Figure 10:
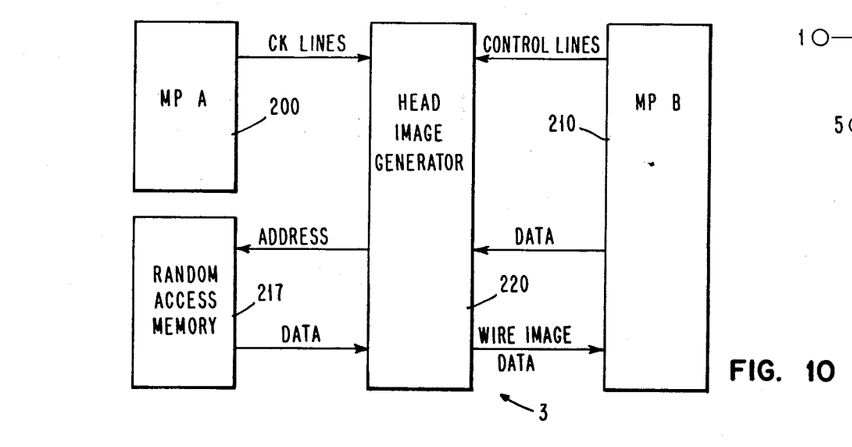
FIG. 10 is a generalized block diagram of the printer control unit shown in FIG. 1.

FIG. 10 is a highly diagrammatic block diagram of the general relationship of various components in printer control unit 3, FIG. 1, the components including two microprocessors 200 and 210 (Also designated MPA and MPB), a Head Image Generator 220 and a random access memory 217 and indicates how the information is transferred that is generated by the Head Image Generator to print dots on the paper by energization of the actuators.

The printers control unit 3 connects the printer to the interface cable from the controlling device, controls the flow of information to and from the controlling device and controls all internal printer functions.

When data is received for printing, the printer control unit formats the data into print lines, using formatting commands (control codes) embedded in the data stream. Two print-line text buffers are stored in memory 217 so one line can be printed while the next line is being formatted. This comprises a "lookahead" function which allows bidirectional printing for maximum throughput.

The microprocessors may be of the type described in U.S. patent application Ser. No. 918,223 filed June 23, 1978, now U.S. Pat. No. 4,179,738 which issued Dec. 18, 1979, and having P. T. Fairchild and J. C. Leininger as inventors and entitled "Programmable Control Latch Mechanism for a Data Processing System".

Figure 12:
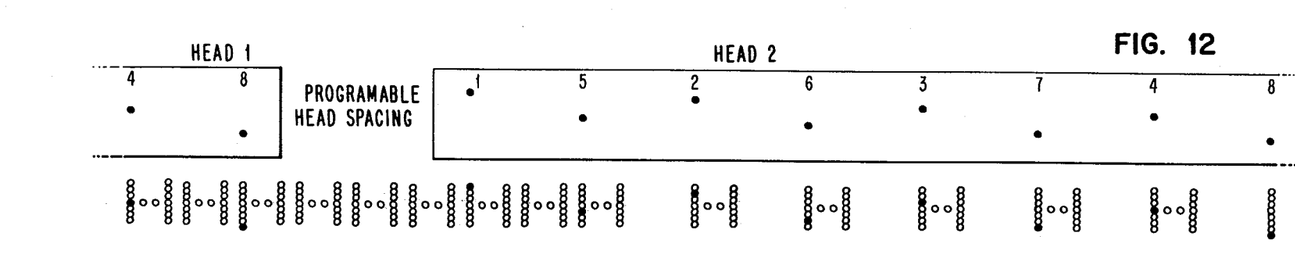

Microprocessor 200 handles communications; microprocessor 210 handles the control of the subsystems. Microprocessor 200 sets up in memory 217 the count and the text buffer that is to be printed at a selected addressable location. The information is then passed over to microprocessor 210 or the buffer that is to be used. The count is passed to the Head Image Generator 220 and also the address in memory 217 which is the text buffer to be printed. Head Image Generator (HIG) 220, knowing the buffer to be printed, accesses memory 217 and defines the dots for the characters to be printed at each of the successive columns assigned to each print head as print carrier 31 moves during printing. HIG passes the data to the Control microprocessor 210 giving it all the dots to be printed at that particular time. This is represented in FIG. 12 which includes a portion of head 1 and all of head 2. FIG. 12 illustrates printing at ten characters per inch. A string of "H's" is assumed to require printing. The darkened dots of the "H's" represent the wires above them that will actually print that dot. For example, in print head 1, wire 4 prints the fourth dot down in the first column of the leftmost "H". This is the second slice of firing for that particular character. There are seven horizontal wire fire positions with three wires actually printing to complete the horizontal cross-bar portion of the "H" by wire 4. It requires the other seven wires in print head 1 to fire at appropriate times to complete that character. At head 2, wire 1 is over an "H"; there is no wire over the next "H"; and wire 5 is over the third "H". If printing was at fifteen characters per inch, another character would exist between wires 1 and 5 of head 2, in addition to the one character as illustrated.

Figure 11:
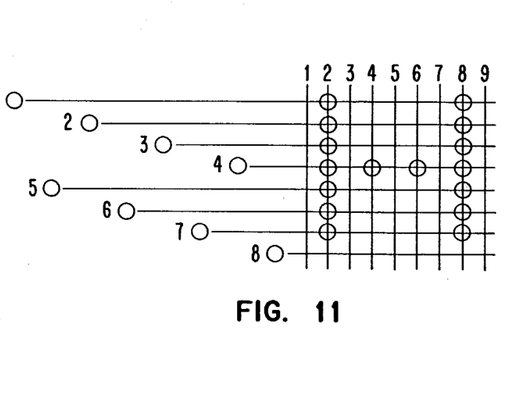
FIGS. 11 and 12 further illustrate the arrangement of dots to form characters and the relationship of the print wires to the various character locations.

The wire layout of "1 5 2 6 3 7 4 8" in FIG. 12 relates to the layout in FIG. 11 where it is shown how an "H" is laid out in relation to the actual wire slices.

WIRE FIRE MAPPING DIAGNOSTICS

Mode switch 65, FIG. 5, is positioned in an appropriate test location to initiate the wire fire mapping diagnostic tests.

During servicing of the printer subsystem, many times it is desirable to know which print wires are firing and which ones are misfiring. This routine provides a quick printout for this purpose.

Figure 13:
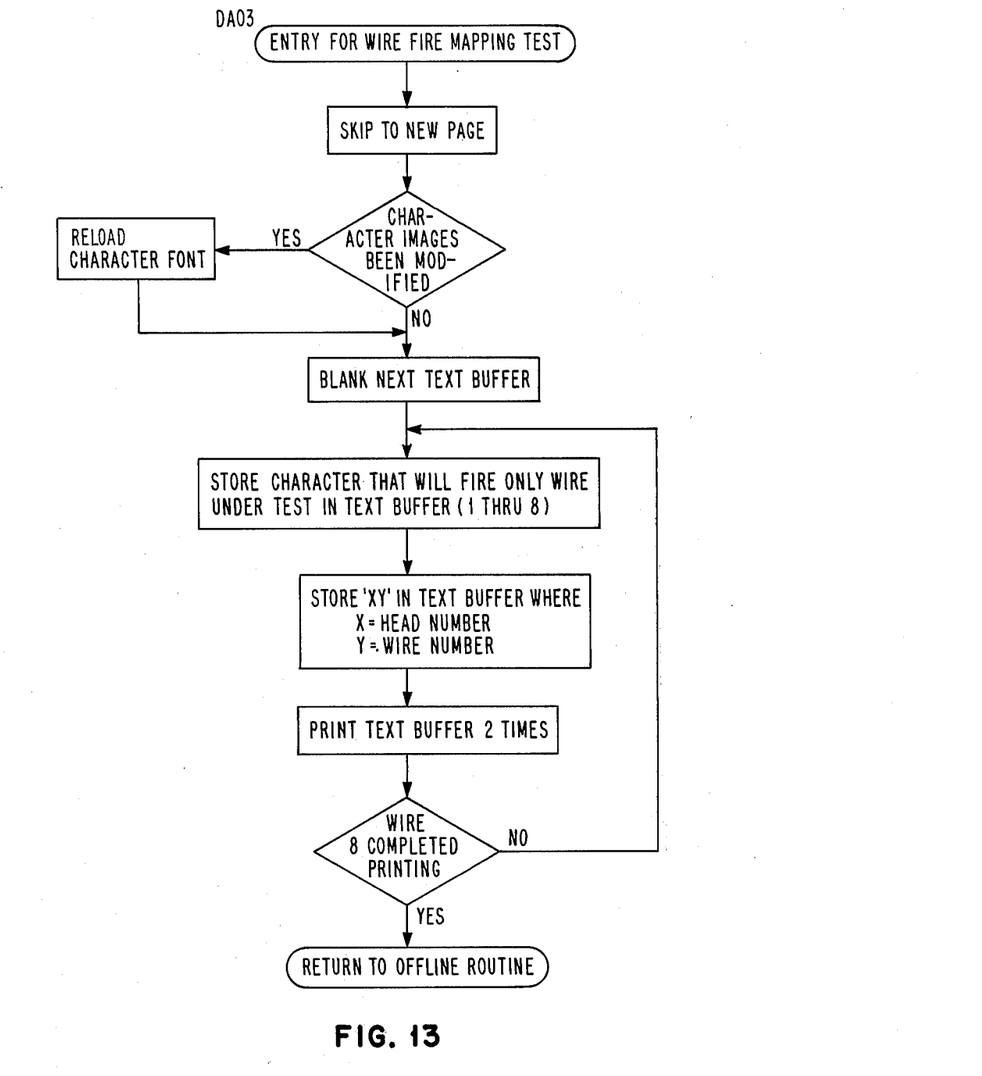
FIG. 13 is a flowchart illustrating the diagnostic routine for the wire fire mapping.
Figure 14:
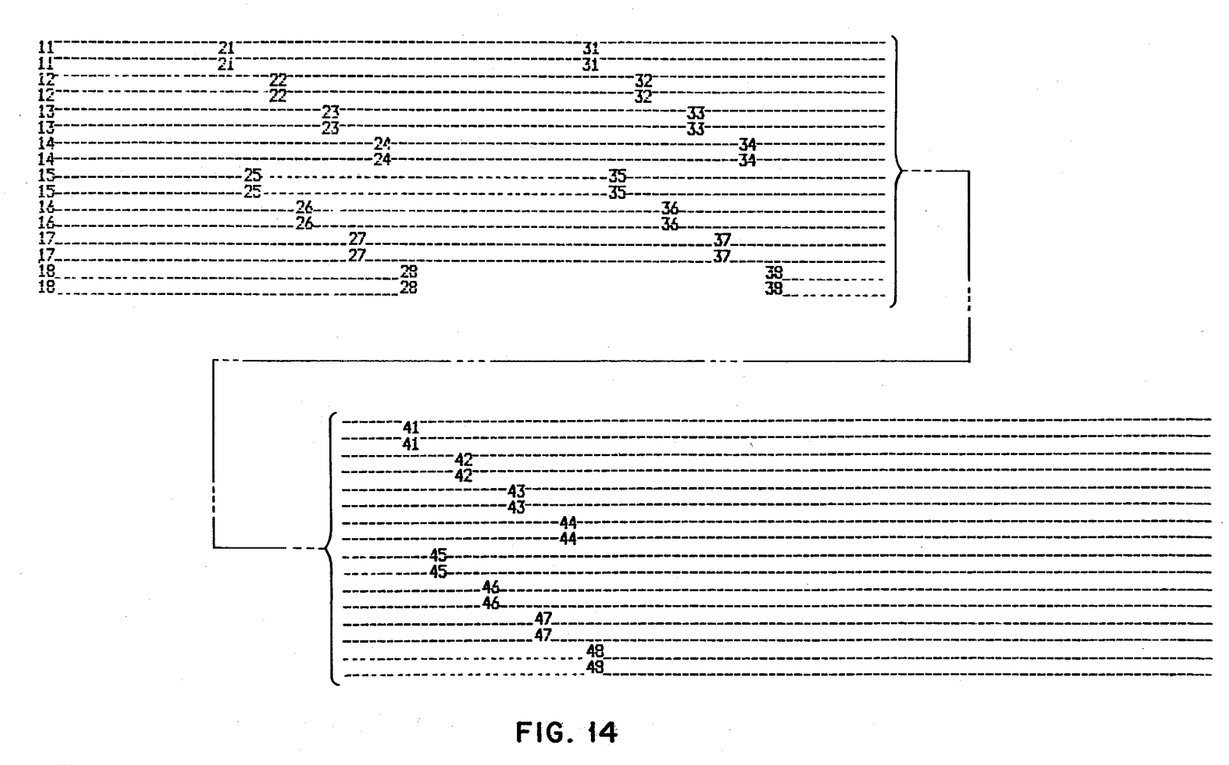
FIG. 14 represents a possible printout of wire firing and misfiring somewhat modified to more clearly illustrate the operations involved in wire fire mapping.

The routine is described in connection with FIGS. 13 and 14. In FIG. 13, the entry to the routine starts by skipping to a new page in memory and then asks the question, "Have any of the character images been modified?" If the answer is "Yes", then the character font is reloaded; if "No", the routine continues down and blanks the next text buffer. In that text buffer a character that will fire only the wire under test is stored in that buffer; that is, one of the wires 1 through 8 for a particular print head. After the text buffer is loaded, the identifiers as to wire and head are stored on top of the buffer. As an example, an "XY" is stored where "X" indicates the head number and "Y" indicates the wire number. Thus, the start of this information indicates head and wire for printing purposes. The text buffer, as stored, is printed twice. A representative printout is shown in FIG. 14 for a printer unit having four print head groups of eight print wires each. The question is now asked, "Was wire 8 printed?" If the answer is "No", the routine goes back, increments to the next wire, stores the image for that particular wire and continues as previously. If the answer is "Yes", the routine has completed the mapping of wire fire test as printed by the printer and returns to the off-line routine.

The mapping printout that is received from the printer, FIG. 14, indicates the number of heads that the particular printer under test is presently using. Starting on the left, there is, for example, a one-one (11), followed by a two-one (21) and continuing across the page until the last head and wire (41) is indicated. If it is an eight-headed machine, the last will be an eight-one (81). Between these numbers appears a dashed line which is printed only by that wire under test. The first line, starting one-one (11), would have a short distance of dashes indicating that wire 1, head 1 is firing. If the dashes are missing, that indicates that there is a problem with head 1, wire 1. The printout continues down the page from head 1, wire 1 to head 1, wire 2 to head 1, wire 3 and so on until it reaches head 1, wire 8. This goes across the page in a matrix type form that shows all wires and all heads at a glance. In the exemplary printout of the mapping of the wire fire test in FIG. 14, head 2, wire 8 is not firing. If head 2, wires 5, 6 and 7 did not fire then the following results would be noticed. The lower half of the following character images would be missing (27), (24), (28), and (31) as wires 5, 6, and 7 print these. Character images (25), (22), (26), (23), (35), (32), (36), and (33) would have portions missing to a lesser degree since wires 5, 6 and 7 help print those. The number in each line merely indicates the start of that particular wire and that particular head, and because the wires themselves are physically offset, some of the numbers are printed by one head and the rest of the numbers are printed by another head.

OPERATION CODES

A number of operation codes are utilized by the microprocessors. These are listed below.

| ALU OP CODES | | |
|---|---|---|
| —MODE VALUE — | | |
| REG TO REG 0__ | | |
| DAR TO DAR 1__ | | |
| REG TO DAR 2__ | | |
| DAR TO REG 3__ | | |
| MSK TO REG 4__ | | |
| MSK TO DAR 5__ | | |
| Function OP Codes | | |
| Add | A | __0__ |
| Add Carry | AC | __1__ |
| Move | M | __2__ |
| Clear (0) | CLR | __2__ |
| Subtract/Borrow | SB | __3__ |
| Subtract | S | __4__ |
| Compare | C | __5__ |
| Subtract Summary | SS | __6__ |
| Compare Summary | CS | __7__ |
| And | N | __8__ |
| Set Bit Off | SBF | __8__ |
| Test | T | __9__ |
| And Summary | NS | __A__ |
| Test Summary | TS | __B__ |
| Or | O | __C__ |
| Set Bit On | SBN | __C__ |
| Shift Right | SR | __D__ |
| Exclusive Or | X | __E__ |
| Shift Right Circular | SRC | __F__ |
| Conditional Branches | | |
| Branch Not Carry, Branch High | BNC,BH | C__ODD |
| Branch Carry, Branch Less Than Or Equal | BC,BLE | D__EVEN |
| Branch Not Zero, Branch Not Equal, Branch True | BNZ,BNE,BT | E__ODD |
| Branch Zero, Branch Equal, Branch False | BZ,BE,BF | F__EVEN |
| Unconditional Branches | | |
| Branch and Wait | BAW | C__EVEN |
| Branch | B | D__ODD |
| Branch and Link | BAL | E__EVEN |
| Branch Via Link | RTN | F001 |
| Return and Link | RAL | F201 |
| Branch Via DAR | BVD | F301 |
| Select Data Address Registers (DAR's) and Storage (STG) | | |
| Select Memory Data Low | SDL | FC01 |
| Select Memory Data High | SDH | FE01 |
| Select Memory Inst Low | SIL | F481 |
| Select Memory Inst High | SIH | F489 |
| Select Data Bit X Off | SXF | F441 |
| Select Data Bit X On | SXN | F445 |
| Select Main DARS | SMD | F501 |

| | | | |
|---|---|---|---|
| Select Aux DARS | SAD | F701 | |
| *Input/Output, Load/Store Ops* | | | |
| Input From Device | IN | 68_ | |
| Sense Device | SNS | 69_ | |
| Output To Device | OUT | 78_ | |
| Direct Input and Output | DIO | 7A_ | |
| Load Registers | LDR | 89XY | |
| Load Registers and DAR+1 | LDRP | 8BXY | |
| Load DAR | LDD | 84XY | |
| Load DAR and DAR+1 | LDDP | 86XY | |
| Load Memory Indexed | LDI | 8A0_ | |
| Memory to I/O Device | MIO | 8C_ | |
| Memory to I/O Device and DAR+1 | MIOP | 8E_ | |
| Load Link Register | LDL | 8000 E | |
| Load Link Register and DAR+1 | LDLP | 8200 E | |
| Load Absolute Address | LDA | 9_ | |
| Store Registers | ST | A9XY | |
| Store Registers and DAR+1 | STRP | ABXY | |
| Store DAR | STD | A4XY | |
| Store DAR and DAR+1 | STDP | A6XY | |
| I/O Data To Memory | IOM | AC_ | |
| I/O Data To Memory and DAR+1 | IOMP | AE_ | |
| Store Memory Indexed | STI | AA0_ | |
| Store Link High Order(Even Byte) | SLH | A000 | |
| Store Link High Order and DAR+1 | SLHP | A200 | |
| Store Link Low Order (Odd Byte) | SLL | A100 | |
| Store Link Low Order and DAR+1 | SLLP | A300 | |
| Store In Absolute Address | STA | B_ | |

MICROPROCESSOR REGISTERS

Figure 15:
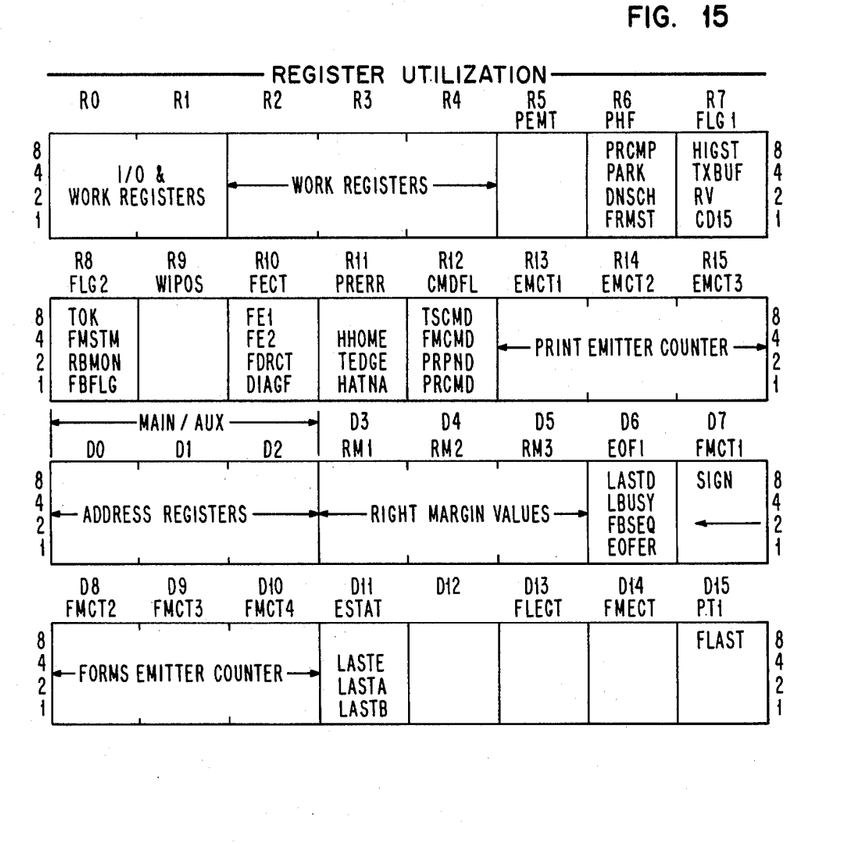
FIG. 15 illustrates layout of various internal registers in the control microprocessor.

Each of the microprocessors 200 and 210 has a number of internal registers that are used for various purposes such as work registers. The register layout for the Control microprocessor 210 is shown in FIG. 15.

As a convenience, the register assignments are listed below.

| Communications Microprocessor Registers | | | |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |

| Communications Microprocessor Registers | | | |
|---|---|---|---|
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0 = 1, 1 = 2) |
| RAMP | EQU | X'1' | Rest for Ramp Indicator |
| LSCON | EQU | D11 | Last Console Setting /F = In Load Mode |
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |
| D2LD | EQU | X'4' | Mask To Test for 2nd Data Load |
| D3LD | EQU | X'C' | Mask To Test 1st and 2nd Data Load |
| RESN1 | EQU | X'1' | Mask To Test for 1st Resend |
| RESN2 | EQU | X'2' | Mask To Test for 2nd Resend |
| RESND | EQU | X'3' | Mask To Test for Either Resend |
| NOLD | EQU | X'F' | Mask To Test for No Command |
| MVADJ | EQU | D15 | Adjustment Control Byte |
| RLRD1 | EQU | X'9' | Roll and Ready Indicator Together |
| ROLLD | EQU | X'8' | Roll Display Indicator |
| CHGD | EQU | X'4' | Change To Next Sequence Indicator |
| ADJP1 | EQU | X'2' | Change Density Mask |
| RDY1 | EQU | X'1' | Software Ready Indicator |
| RAMIN | EQU | X'OFFB | End of Random Access Memory in ROS Slot |

| Control Microprocessor Registers | | | |
|---|---|---|---|
| I00 | EQU | R0 | Input/Output Register |
| I01 | EQU | R1 | Input/Output Register |
| | | R2 | Work Register |
| | | R3 | Work Register |
| | | R4 | Work Register |
| PEMT | EQU | R5 | Indicates Previous Emitters |
| PHF | EQU | R6 | Print Head Flags |
| FRMST | EQU | X'1' | Forms Start Flag |
| DNSCH | EQU | X'2' | Density Change Flag |
| PARK | EQU | X'4' | Ramp Command Flag |
| PRCMP | EQU | X'8' | Printing is Complete |
| FLG1 | EQU | R7 | Indicator Flags |
| CD15 | EQU | X'1' | Character Density Equals 15 CPI |
| RV | EQU | X'2' | Print Head is Going Left (Reverse) |
| TXBUF | EQU | X'4' | Head Image Generator Is to Use Text Buffer 2 |
| HIGST | EQU | X'8' | Head Image Generator Is to Start Print Lines |
| FLG2 | EQU | R8 | Ribbon Flags |
| FBFLG | EQU | X'1' | Wire Feedback Flag |
| RBMON | EQU | X'2' | Ribbon Motor Is On |
| FMSTM | EQU | X'4' | Forms Time Flag |
| TOK | EQU | X'8' | Turn Around Is OK |

-continued

| Control Microprocessor Registers | | | |
|---|---|---|---|
| WIPOS | EQU | R9 | Wire Position Counter |
| FECT | EQU | R10 | False Emitter Counter |
| DIAGF | EQU | X'1' | Diagnostic Flag |
| FDRCT | EQU | X'2' | Directions of Forms Movement |
| FE2 | EQU | X'4' | False Emitter 2 |
| FE1 | EQU | X'8' | False Emitter 1 |
| PRERR | EQU | R11 | Printer Error Flags |
|  | EQU | X'8' | Not Used |
| HHOME | EQU | X'4' | Head Home Flag |
| TEDGE | EQU | X'2' | Turnaround Edge Flag |
| HATNA | EQU | X'1' | Head Stopped At Turnaround Flag |
| CMDFL | EQU | R12 | Command Flags |
| PRCMD | EQU | X'1' | Print Command Flag |
| PRPND | EQU | X'2' | Print Command Is Pending |
| FMCMD | EQU | X'4' | Forms Command Flag |
| TSCMD | EQU | X'8' | Test Command Flag |
| EMCT1 | EQU | R13 | Emitter Counters - Used To Determine |
| EMCT2 | EQU | R14 | Head Position by |
| EMCT3 | EQU | R15 | the Number of Emitters From Left Margin |
| MAIN/AUX | EQU | D0,D0 Aux | Address Registers |
| MAIN/AUX | EQU | D1,D1 Aux | Address Registers |
| MAIN/AUX | EQU | D2,D2 Aux | Address Registers |
| RM1 | EQU | D3 | Indicates Right Margin |
| RM2 | EQU | D4 | When the Emitter |
| RM3 | EQU | D5 | Counter Attains This Value |

| End of Forms Indicators | | | |
|---|---|---|---|
| EOFI | EQU | D6 | End of Forms Indicators |
| LASTD | EQU | X'8' | Last Forms Direction, 1 = Forward; 0 = Reverse |
| LBUSY | EQU | X'4' | Busy History Indicator |
| FBSEQ | EQU | X'2' | Busy Sequence Flag |
| EOFER | EQU | X'1' | End of Forms Detected Indicator |
| FMCT1 | EQU | D7 | 16 Bit Forms AB Emitter Counter |
| FMCT2 | EQU | D8 | |
| FMCT3 | EQU | D9 | |
| FMCT4 | EQU | D10 | |
| SIGN | EQU | X'8' | Counter Sign Bit |
| Emitter Status Register | | | |
| ESTAT | EQU | D11 | |
| LASTE | EQU | X'4' | Last End-of-Forms Emitter Value |
| LASTA | EQU | X'2' | Last Forms A Emitter Value |
| LASTB | EQU | X'1' | Last Forms B Emitter Value |
|  | EQU | D12 | |
| FLECT | EQU | D13 | Forms Lost Emitter Counter |
| FMECT | EQU | D14 | Forms Missing Emitter Counter |
| PT1 | EQU | D15 | Program Timer 1/Forms Command Count |
| FLAST | EQU | X'8' | 8 or More Forms Commands Flag |

Equates—Communications Microprocessor

The following equivalent expressions, that is, "equates", are used in connection with Communications microprocessor program listings. These are used by an Assembler to fill in a number for the English-type expressions.

| Name | Definition |
|---|---|
| ADRAM | Start of Data in Random Access Memory |
| CMDT1 | Data for Command Data #1 Latches |
| CMLAT | Data for Command Latches |
| D1LD | Mask to Test for 1st Data Load |
| D3LD | Mask to Test for 2nd Data Load |
| HDSP | Head Space for DA0S Routine |
| HEADS | Number of Heads Switch |
| OVLYM | Select Main Overlay Memory |
| OVLY3 | Select Overlay 3 Memory |
| PASS2 | Pass Count for Dummy Forms in SBI |
| RDYI | Software Ready Indicator |
| TBF15 | Data in Text Buffer 1 (15 CPI) |

Labels—Communications Microprocessor

The following labels are used by the Communications microprocessor. These serve, for example, as pointers for addressing or for branching purposes.

| Labels | Labels |
|---|---|
| AGN | MODEX |
| BFBLK | NEWPG |
| BFILL | NLFWD |
| CONWI | OPPNL |
| FILL | RELOD |
| FRMEN | RTNMP |
| GETBF | SAVOV |
| HD2 | SDAT1 |
| HD4 | SVHDS |
| HD6 | TFRE1 |
| HD8 | TOCTL |
| LOWER | WIDTA |
| XCOMM | |

Program Listings

Program listings (source statements) that relate to the flowcharts and routines described herein are presented below:

| | Set Up Bit to Fire Wires 1-8 Which Are Stored in Hex Locations 00-0F of Wire Image Random Access Memory | | |
|---|---|---|---|
| Label | Op Code | Arguments | Comment |
| DA03 | EQU | | |
| | BAL | SAVOV | SAVE POINTER TO RETURN THIS OVERLAY |
| | OUT | OVLY3 | POINT TO OVERLAY |
| | BAL | NEWPG | SET NEW PAGE |
| | T | X'8',LOADI | RELOAD NEEDED IF HOST MODIFIED |
| | BF | CONWI | GO CONTINUE WIRE SETUP IF NOT |
| | BAL | SAVOV | SAVE POINTER TO RETURN THIS OVERLAY |
| | BAL | RELOD | GO RELOAD IF NEEDED |

Set Up Bit to Fire Wires 1-8 Which Are Stored in Hex Locations 00-0F of Wire Image Random Access Memory

| Label | Op Code | Arguments | Comment |
|---|---|---|---|
| CONWI | M | X'4',LOAD1 | INDICATE HARDWARE MODIFIED RANDOM ACCESS MEMORY |
| | M | X'0',WORK2 | INITIAL COUNT OF WIRES |
| | M | X'0',WORK3 | INITIAL COUNT OF FRAMES |
| | M | X'0',WORK4 | ZERO FOR STORING |
| | LDAR | ADRAM | GET RANDOM ACCESS MEMORY ADDRESS |
| | M | ADRAM,D2,4 | SET UP ADDRESS IN DAR'S |
| | M | ADRAM,D1,3 | |
| | M | ADRAM,D0,2 | |
| | M | X'8',WORK0 | SET BIT TO PRINT WIRE |
| | M | X'0',WORK1 | REST OF BYTE BLANK |
| WIDTA | ST | WORK0,WORK1 | STORE 2 NIBBLES |
| | A | X'1',D0 | POINT TO NEXT SLICE |
| | ST | WORK4,WORK4 | STORE A BLANK |
| | A | X'1',D0 | POINT TO NEXT SLICE |
| | A | X'1',WORK3 | COUNT FRAMES |
| | C | X'7',WORK3 | CHECK FOR END OF 2ND FRAME |
| | BE | FRMEN | AND GO SET UP FOR NEXT FRAME |
| | C | X'4'WORK3 | CHECK FOR END OF 1ST FRAME |
| | BNE | WIDTA | CONTINUE IF NOT |
| | STRP | WORK4,WORK4 | STORE AND INCREMENT |
| | M | X'0',D0 | POINT TO NEXT FRAME |
| | ST | WORK4,WORK4 | STORE A BLANK |
| | A | X'1',D0 | POINT TO NEXT SLICE |
| | B | WIDTA | GO DO IT AGAIN |
| FRMEN | ST | WORK4,WORK4 | POINT TO NEXT CHARACTER |
| | A | X'1',D0 | POINT TO NEXT SLICE |
| | STRP | WORK4,WORK4 | STORE AND INCREMENT |
| | M | X'0',WORK3 | SET COUNT IN FRAME |
| | SR | WORK0,WORK0 | MOVE BIT THROUGH BYTE |
| | SR | WORK1,WORK1 | MOVE BIT THROUGH BYTE |
| | M | X'0',D0 | POINT TO NEXT FRAME |
| | A | X'2',WORK2 | POINT TO NEXT WIRE |
| | BNC | WIDTA | GO SET NEXT ONE |

Set Up Pointers to Text Buffers

| Label | Op Code | Arguments | Comment | | |
|---|---|---|---|---|---|
| | M | X'3',WORK8 | SET TO COUNT UPPER WIRES | | |
| | M | X'0',DATA4 | INITIAL SPACE VALUES | | |
| | M | X'4',DATA5 | INITIAL SPACE VALUES | | |
| | M | X'1',DATA6 | INITIAL SPACE VALUES | | |
| | M | X'9',DATA7 | INITIAL SPACE VALUES | | |
| | LDA | HEADS | FIND NUMBER OF HEADS | | |
| | C | X'3',WORK0 | CHECK FOR 2 | | |
| | BH | HD2 | GO GET VALUE FOR THESE HEADS | | |
| | C | X'5',WORK0 | CHECK FOR 4 | | |
| | BH | HD4 | GO GET VALUE FOR THESE HEADS | | |
| | C | X'7',WORK0 | CHECK FOR 6 | | |
| | BH | HD6 | GO GET VALUE FOR THESE HEADS | | |
| | B | HD8 | GO GET VALUE FOR 8 HEADS | | |
| HD2 | A | X'8',DATA5 | INITIAL VALUE WHEN ENTERED HERE | | |
| | AC | X'1',DATA4 | 2ND HEAD X'2B' NEXT HEAD X'—' | | |
| HD4 | A | X'9',DATA5 | 13 | 28 | |
| | AC | X'0',DATA4 | .. | .. | |
| | A | X'9',DATA7 | .. | .. | |
| | AC | X'0',DATA6 | .. | .. | |
| HD6 | A | X'6',DATA5 | 0A | 1F | |
| | AC | X'0',DATA4 | .. | .. | |
| | A | X'6',DATA7 | .. | .. | |
| HD8 | EQU | | 04 | 19 | |
| VALU1 | M | X'0',DATA8 | INITIAL DATA TO X'00' AND X'01' | | |
| | M | X'1',DATA9 | | | |
| | M | DATA4,WORK0 | SET UP TO SAVE DISPLACEMENT VALUE | | |
| | M | DATA5,WORK1 | | | |
| | STA | HDSP | | | |

Fill Random Access Memory Buffer (198) With Image for One Wire

| Label | Op Code | Arguments | Comment |
|---|---|---|---|
| BFILL | EQU | | |
| | BAL | SAVOV | SAVE POINTER TO RETURN THIS OVERLAY |
| | BAL | BFBLK | GO BLANK AND GET BUFFER ADDRESS |

Fill Random Access Memory Buffer (198) With Image for One Wire

| Label | Op Code | Arguments | Comment |
|---|---|---|---|
| | M | TBF15,D1,3 | POINT TO DATA IN TEST BUFFER (15 CPI) |
| | M | TBF15,D2,4 | POINT TO DATA IN TEST BUFFER (15 CPI) |
| FILL | M | X'0',WORK2 | |
| | M | DATA8,WORK0 | |
| | M | DATA9,WORK1 | |
| | STRP | WORK2,WORK0 | STORE ALTERNATE |

Fill Random Access Memory Buffer (198) With Image for One Wire

| Label | Op Code | Arguments | Comment |
|---|---|---|---|
| | STRP | WORK2,WORK1 | IMAGES FOR EACH WIRE |
| | C | X'D',D1 | COUNT FOR 63 (LOW ORDER) |
| | CS | X'B',D2 | COUNT FOR 63 (HIGH ORDER) |
| | BNE | FILL | |

Fill in Head and Wire Number for Start of Each Head

| Label | Op Code | Arguments | Comment |
|---|---|---|---|
| | BAL | SAVOV | SAVE POINTER TO RETURN THIS OVERLAY |
| | BAL | GETBF | POINT TO START OF BUFFER |
| | M | TBF15,D1,3 | POINT TO DATA IN TEST BUFFER (15 CPI) |
| | M | TBF15,D2,4 | POINT TO DATA IN TEST BUFFER (15 CPI) |
| | M | X'F',WORK4 | SET START OF EBCDIC NUMBER |
| | M | X'1',WORK5 | SET NUMBER 1 FOR START OF HEAD |
| | STRP | WORK4,WORK5 | STORE IN FIRST COLUMN |
| | M | DATA8,WORK6 | GET WIRE NUMBER |
| | SR | WORK6,WORK6 | |
| | A | X'1',WORK6 | |
| | STRP | WORK4,WORK6 | STORE IT IN BUFFER |
| | A | X'2',DATA8 | POINT TO NEXT IMAGE |
| | A | X'2',DATA9 | POINT TO NEXT IMAGE |
| | A | X'1',WORK5 | SET FOR SECOND HEAD |
| | LDA | HEADS | GET NUMBER OF HEADS |
| | M | WORK0,WORK7 | SET FOR COUNTER |
| | S | X'1',WORK7 | DECREMENT |
| | LDA | HDSP | |
| | A | WORK1,D2 | ADD START OF NEXT HEAD |
| | AC | WORK0,D1 | |
| AGN | STRP | WORK4,WORK5 | STORE NEXT HEAD NUMBER START |
| | STRP | WORK4,WORK6 | STORE THIS WIRE NUMBER |
| | A | X'1',WORK5 | SET FOR NEXT HEAD |
| | A | DATA7,D2 | INCREMENT TO NEXT HEAD |
| | AC | DATA6,D1 | |
| | S | X'1',WORK7 | COUNT DOWN |
| | BNZ | AGN | DO IT AGAIN IF MORE HEADS |
| | SBF | PASS2,POINT | PREPARE SECOND TIME THROUGH SWITCH |
| TFRE1 | T | D3LD,CMCTL | TEST FOR COMMAND IN CONTROL ATOM |
| | BF | SDAT1 | OK NOW LOAD NEW COMMAND |
| | BAL | SAVOV | SAVE POINTER TO RETURN THIS OVERLAY |
| | OUT | OVLY3 | POINT TO PROPER OVERLAY |
| | BAL | ATOM2 | ALLOW LOAD TO CONTROL ATOM IF READY |
| | BAL | SAVOV | SAVE POINTER TO RETURN THIS OVERLAY |
| | OUT | OVLYM | POINT TO MAIN OVERLAY MEMORY |
| | BAL | OPPNL | GO CHECK OPERATOR PANEL |
| | B | TFRE1 | GO TEST FOR OK TO GO AGAIN |
| SDAT1 | EQU | | |
| | BAL | SAVOV | SAVE POINTER TO RETURN THIS OVERLAY |
| | OUT | OVLYM | POINT TO MAIN OVERLAY MEMORY |
| | BAL | PTPRT | GO CHECK FOR PAPER IN PRINT POSITION |
| | T | D3LD,CMCTL | TEST FOR COMMAND TO |

-continued

Fill in Head and Wire Number for Start of Each Head

| Label | Op Code | Arguments | Comment |
|---|---|---|---|
| | BT | TFRE1 | TRANSFER GO WAIT IF STACK FULL |
| | T | RDYI,MVADJ | TEST FOR STOP BUTTON PRESSED |
| | BF | MODEX | RETURN TO WAIT LOOP IF STOP |
| | M | X'F',WORK0 | SET TO PRINT 198 (198 + 42 = 240) |
| | M | X'0',WORK1 | |
| | STA | CMDT1 | AND SET FOR DATA LATCHES |
| | CLR | WORK0 | PREPARE PRINT COMMAND |
| | M | X'0',WORK0 | SET REG/DAR TO ZERO |
| | M | BFNUM,WORK1 | SET BUFFER INDICATOR |
| | SBF | X'D',WORK1 | REMOVE ALL BUT BUFFER BIT |
| | SBN | X'9',WORK1 | SET PRINT AND 15 CPI INDICATORS |
| | STA | CMLAT | AND SAVE THE STATUS LATCHES |
| | SBN | D1LD,CMCTL | INDICATE DATA READY TO TRANSFER |
| | M | X'0',WORK0 | SET UP FOR LINE FEED |
| | M | X'1',WORK1 | |
| | BAL | SAVOV | SAVE POINTER TO RETURN THIS OVERLAY |
| | OUT | OVLY3 | POINT TO OVERLAY |
| | BAL | NLFWD | GO TO FORMS |
| | X | PASS2,POINT | COUNT NUMBER OF LINES PRINTED |
| | T | PASS2,POINT | TEST FOR SECOND PASS |
| | BT | TFRE1 | IF FIRST GO PRINT AGAIN |

Prepare to Set Up Next Buffer

| Label | Op Code | Arguments | Comment |
|---|---|---|---|
| | C | X'0',DATA8 | IS TEST SET UP COMPLETE |
| | BE | RTNMP | RETURN TO MODE CONTROL OR ROUTINE 1 |
| | LDA | HDSP | GET THE HEAD SPACE VALUE |
| | C | X'8',DATA8 | CHECK WHICH WIRE WE ARE ON |
| | BE | LOWER | ARE WE STARTING LOWER 4 WIRES |
| | A | X'6',WORK1 | SET HEAD 2 TO START POSITION |
| | AC | X'0',WORK0 | |
| SVHDS | STA | HDSP | SAVE NEW VALUE |
| | B | BFILL | GO SET NEXT LINE |
| LOWER | S | X'F',WORK1 | SET HEAD 2 TO START POSITION |
| | SB | X'0',WORK0 | |
| | B | SVHDS | GO SET NEXT LINE |

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

We claim:

1. Diagnostic apparatus for a printer unit having at least one print head, said print head having a plurality of print wires and actuators arranged in a nonconventional print wire pattern, such as a slanted serrated pattern, said diagnostics comprising:

selection means to select a plurality of diagnostic test operations for said printer unit, including a wire fire mapping test operation;

storage means for storing print wire images for test purposes; and wire fire mapping means operable responsive to said selection means when the wire fire mapping test operation is selected for entering test data representative of a predetermined test pattern in said storage means and for supplying actuating signals to said print wire actuators in accordance with said predetermined test pattern to display on a record medium the actual firing and misfiring condition of said print wire actuators and associated print wires, said wire fire mapping means incorporating head/wire designation means for entering data in said storage means that will actuate said print wire actuators and associated print wires to provide identifying indicia on said record medium indicative of the print heads and print wires in order that wire firings and misfirings may be readily diagnosed.

2. The apparatus of claim 1, wherein said wire fire mapping means is operable to activate said print wire actuators and print wires in accordance with a sequential pattern to display the wire firings and misfirings in a matrix format arranged sequentially in accordance with the numbering of print heads and print wires utilized in the printer.

3. Diagnostic apparatus for a printer unit having a plurality of actuators and a plurality of print heads, each of which comprises a plurality of print wires, arranged in a nonconventional print wire pattern, such as a slanted serrated pattern, said diagnostics comprising:

selection means to select a plurality of diagnostic test operations for said printer unit, including a wire fire mapping test operation;

storage means for storing print wire images for test purposes; and wire fire mapping means operable responsive to said selection means when the wire fire mapping test operation is selected for entering test data representative of a predetermined test pattern in said storage means and for supplying actuating signals to said print wire actuators in accordance with said predetermined test pattern to display on a record medium the actual firing and misfiring condition of said print wire actuators and associated print wires;

means for mounting said print heads in an array adjacent a print line for printing information on a record medium;

means for reciprocating said print heads along said print line while activating said print wires in said print heads on a concurrent basis in order to print the wire fire mapping on said record medium;

control means incorporated in said wire fire mapping means to enter data in said storage means pertaining to said print wires on a sequential basis with data concerning a particular print wire being printed prior to the entry of data for the next succeeding print wire, said data including information to be printed, such as head number and wire number; and additional control means in said wire fire mapping means for controlling the printing of the wire fire data in said storage means at least twice in order to enable quicker analysis of the wire fire mapping printout.

\* \* \* \* \*